United States Patent [19]
Kleifges et al.

[11] Patent Number: 5,884,743
[45] Date of Patent: Mar. 23, 1999

[54] CLUTCH PLATE WITH CENTERING FEATURE

[75] Inventors: Jürgen Kleifges; Harald Jeppe, both of Schweinfurt; Jürgen Weth, Niederwerrn; Reinhard Feldhaus, Ebenhausen; Norbert Lohaus; Andreas Orlamünder, both of Schweinfurt; Klaus Memmel, Gädheim, all of Germany

[73] Assignee: Fichtel & Sachs AG, Schweinfurt, Germany

[21] Appl. No.: 762,499

[22] Filed: Dec. 9, 1996

[30] Foreign Application Priority Data

Dec. 9, 1995 [DE] Germany ......................... 195 45 973.3
Feb. 15, 1996 [JP] Japan ..................................... 8-001467

[51] Int. Cl.[6] .................................................. F16D 13/64
[52] U.S. Cl. ................................. 192/213.12; 192/70.17; 192/204
[58] Field of Search ........................... 192/213.1, 213.11, 192/213.12, 204, 70.17, 273

[56] References Cited

U.S. PATENT DOCUMENTS

| | | | |
|---|---|---|---|
| 4,453,838 | 6/1984 | Loizeau | 192/204 X |
| 4,548,309 | 10/1985 | Braun | 192/204 |
| 5,064,041 | 11/1991 | Graton et al. | 192/204 |
| 5,161,660 | 11/1992 | Huber | 192/213.1 |
| 5,240,458 | 8/1993 | Linglain et al. | 192/213.12 X |
| 5,246,398 | 9/1993 | Birk et al. | 192/213.12 X |
| 5,529,161 | 6/1996 | Ament et al. | |
| 5,711,407 | 1/1998 | Maier | 192/213.12 X |

FOREIGN PATENT DOCUMENTS

| | | |
|---|---|---|
| 0732524 | 9/1996 | European Pat. Off. . |
| 2418062 | 10/1975 | Germany . |
| 2916868 | 11/1980 | Germany . |
| 3248119 | 6/1984 | Germany . |
| 3928065 | 3/1990 | Germany . |
| 3921283 | 8/1990 | Germany . |
| 59-133829 | 8/1984 | Japan . |
| 2240414 | 9/1990 | Japan . |
| 2258515 | 2/1993 | United Kingdom . |

*Primary Examiner*—Rodney H. Bonck
*Assistant Examiner*—Saúl J. Rodriguez
*Attorney, Agent, or Firm*—Nils H. Ljungman

[57] ABSTRACT

A clutch plate in which the support of the hub provides for pivoting as well as radial compliance relative to the remaining components. This support is accomplished by a component, which is centered directly or indirectly on the hub plate of the load compliance, whereby the load springs can be employed for radial compliance of the hub.

10 Claims, 5 Drawing Sheets

CLUTCH PLATE WITH CENTERING FEATURE

BACKGROUND OF THE INVENTION

1. Field of the Invention

The present invention relates to a clutch plate for a friction clutch, the clutch plate including a hub with internal gearing for connection to a transmission shaft, external gearing on the hub plate for engaging with a mating gear with play towards the circumference (i.e., some rotational play between the external gearing on the hub and the mating gear), cover plates provided on both sides of the hub plate, the cover plates being nonrotationally connected to each other and held at a distance from one another, and one of the cover plates being provided with friction linings, windows provided in the hub plate and the cover plates for placement of the springs of a load spring feature, used during engagement, for elastic torque transfer, a hub plate as part of an idle spring feature, used during disengagement, between one of the cover plates and the hub plate, which are nonrotationally engaged with the external gearings of the hub, as well as at least a cover plate between the hub plate of the idle spring feature and the cover plate of the load spring feature for the positioning of springs in windows provided in the cover plate and hub plate for providing for elastic rotation in the region of rotational play between the external gearing and the mating gear, the cover plate being nonrotationally engaged with the hub plate by means of angular shaped projections extending in the axial direction, and the cover plate being supported by the hub plate in the axial direction.

2. Background Information

A clutch plate of the above mentioned design is described, for example, in German Patent Application 39 21 283. With this construction, one of the cover plates of the load spring feature is supported relative to the hub by a radial elastic ring bearing. This ring bearing allows for a certain amount of motion between the hub and the cover plates as well as a certain pivoting motion.

In this connection, reference is made to German Patent 32 48 119 as a current state of the art, in which patent one of the cover plates of a load spring feature is supported relative to the hub by means of a bushing of near cone shaped contour, a force in the axial direction being applied to this bushing towards the centering position.

It has been found, that solutions with today's transmission design, according to the current state of the art, are not sufficient and operationally safe, without supporting the transmission shaft in a pilot bearing of the crankshaft. The essentially radial suspension is not sufficient in some cases, and pure pivoting capability is not sufficient in others.

OBJECT OF THE INVENTION

Therefore, one object of the present invention is the provision of a clutch plate free from potential malfunctions, which provides greater resilience between the hub and the cover plates, the cover plates being provided with friction linings.

SUMMARY OF THE INVENTION

Such an inventive clutch plate is disclosed herein. Radial resilience can be generated by means of the spring units of the load spring feature by positioning a rising contour between the hub and a ring shaped element in the axial direction, which ring shaped element is guided on the hub plate in the radial direction. This allows the use of already existing components to accomplish the desired outcome.

It is further recommended that, in one preferred embodiment of the invention, a mating surface be provided on an axial end region of the external gearing that is provided on the hub. Implementation of this mating surface is preferably ball shaped, and the contour of the ring shaped element is preferably cone shaped.

The above described configuration has a self centering effect as a result of the axial compression force in some cases, and with others, it is possible that both parts with the contour and mating surfaces can avoid each other in the radial/axial directions, at least temporarily, by the radial assertion of force.

It is advantageous, based on an additional feature of the invention, that the ring shaped element and the mating surface of the external gearing are positioned on the side of the hub plate of the load spring feature opposite to the hub plate for the idle spring feature. This construction is favorable in consideration of accommodating the contour and mating surfaces and in consideration of ease of assembly.

It is also possible however, without reservations, to place the ring shaped element and the mating surface of the external gearing on the side of the hub plate for the idle spring feature [disengagement]. Any pivoting motion occurring in this type of design may, to a very small extent, have an effect on the hub plate for the idle spring feature.

The spring for the holding of the contour and mating surfaces in the axial direction is preferably of the crinkle washer type, which crinkle washer is preferably positioned between a shoulder provided on the external gearing of the hub and the hub plate for the idle spring arrangement, and preferably on a portion of reduced diameter of the external gearing of the hub and nonrotationally engaged therewith but loosely positioned in the axial direction, and which crinkle washer keeps the ring shaped element in contact with the cover plate. The type of spring to be used could also be a cup spring (e.g., a so-called membrane spring) for example. Positioning of the spring units is especially simple, since the shoulder for the positioning of the hub plate is already present on the external gearing of the hub.

In one embodiment of the invention, support of the spring units may be accomplished by both a contour and a mating surface, as well as by a friction element, which is compressed between the cover plate of the idle spring feature and the associated cover plate of the load spring feature by means of a load friction spring. The friction element preferably has a bearing surface for the hub plate of the idle spring feature in its internal diameter area. A friction element can also be employed for supporting the spring units in the axial direction, which is already provided in this location for the generation of a load friction.

It is especially advantageous, in another embodiment of the invention, to place the ring shaped element such that its outside diameter is positioned within the inside diameter of a control plate, the control plate being held by friction between the hub plate and a cover plate and being aligned on at least one spring unit for load compliance. The ring shaped element is in this way directly supported by means of the control plate on the load spring feature and is, in addition to this elastic support, cushioned by the friction hold of the control plate.

In this embodiment, the control plate preferably exhibits two diagonally positioned centering projections, which centering projections are centered on (e.g., engaged with) the face ends of the spring units, preferably fashioned as coiled springs, by means of two corresponding controlling edges provided on the centering projections. This design assures that at least one of the coiled springs is employed for radial shock absorption at all times, independent of the direction of the force acting on the ring shaped element.

In another embodiment of the invention, it is possible, without reservations, to center the ring shaped element in the radial direction directly onto the hub plate by means of projections protruding from the ring shaped element in the axial direction into openings of the hub plate, the ring shaped element being thereby loosely guided in the axial direction. Such a construction is possible, for example, where no control plate is to be provided. The radial-elastic support here is accomplished by means of the hub plate and its windows, also opposite of the springs of the load spring feature.

The projections protruding axially from the ring shaped element thereby engage in the radial direction, preferably immediately radially outside of the external gearing of the hub, into openings provided in the hub plate. An especially advantageous design can thus be realized, wherein at least some of spaces between the teeth of the mating gear (provided on the hub plate) are enlarged into openings in the radial outward direction for engagement with the axially protruding projections of the ring shaped element. Such a embodiment can easily be constructed.

In yet another embodiment of the invention, an additional refinement in the design provides for the ring shaped element to rest on the cover plate (e.g., the cover plate of the idle spring feature) by means of its radial extension, to also nonrotationally engage in the radial direction outward-outside (i.e., radially outward) of the idle spring feature via angled tab portions extending in the axial direction into openings provided in the hub plate and to be held in contact with the cover plate (e.g., the cover plate of the load spring feature) in the radial direction within the tabs of a load friction spring, which cover plate (e.g., the idle spring cover plate) is supported by the hub plate as well. With this type of design, the ring shaped element is at the same time engaged as the friction element and is supported directly by the hub plate. Such a construction provides for a reduction in the number of required components.

In order to simplify the manufacturing process, in this embodiment, it is further recommended that preferably the same openings in the hub plate are provided for nonrotationally engaging with the ring shaped element and also with the cover plate of the idle spring feature. The points of engagement of the cover plate and/or the ring shaped element can thereby be positioned one above the other in the radial direction.

In some embodiments of the invention, when positioning the contour and mating surfaces on the same side of the hub plate that the idle spring feature is located, it is recommended that the spring used for providing a biasing force in the axial direction is preferably formed as a crinkle washer, which crinkle washer is preferably supported between the external gearing of the hub on the side of the hub plate opposite of the contour and mating surfaces and the corresponding cover plate of the load spring feature. The spring is thereby supported by the already existing contour of the external gear, and the hub plate of the idle spring feature can be freely positioned in the axial direction. This, for example, provides for a certain self adjustment of the hub plate in the axial direction to permit larger pivot angles between the hub and cover plates.

It is advantageous, in some embodiments of the invention, to guide (or position) the ring shaped element in the radial direction by providing that a portion of the ring shaped element abuts (or contacts) the radially inner edge of the cover plate for the idle spring feature. Such a construction establishes the radial orientation between the ring shaped element and the hub plate of the load spring feature, since the cover plate of the idle spring feature is supported by the hub plate in the axial direction and is nonrotationally connected to the hub plate and is thereby also centered in the radial direction.

The ring shaped element can thereby be extended in the radial direction towards the outside (e.g., radially outward), beyond the inside diameter of the cover plate for the idle spring feature, and can additionally function as a load friction element between the cover plate of the idle spring feature and the cover plate of the load spring feature. The ring shaped element thereby fulfills a double function.

In yet another embodiment, the entire design can be simplified by combining the ring shaped element with the cover plate (e.g., of the idle spring feature), so that guidance, friction and spring activation are all united in a single component.

It is thereby advantageous, in such an embodiment, to position the load friction spring between the hub plate of the load spring feature and the cover plate located opposite of the idle spring feature. There is usually space on this side of the hub plate which is allocated for the load friction spring.

In an especially simple design, the ring shaped element and the cover plate for the idle spring feature are combined into a single component, designed as a contour which slopes radially inward, and the mating surface is designed as a plastic ring which is placed on the hub and nonrotationally engages with the end region of the external gear.

To increase the radial resilience and the free pivoting capability of the clutch plate, the windows in the hub plate of the idle spring feature are preferably configured to be open in the outward radial direction and enlarged in the radial direction inward to hold the spring units which are preferably provided in the form of coiled springs. There is no detrimental effect on the functioning of the springs for the idle spring feature, resulting from radial resilience or from pivoting motion.

It is further recommended that play be provided in the radial direction between the external gear of the hub and the mating gear of the hub plate. Such construction enables the hub to execute especially pivoting motions more readily.

The above discussed embodiments of the present invention will be described further hereinbelow with reference to the accompanying figures. When the word "invention" is used in this specification, the word "invention" includes "inventions", that is, the plural of "invention". By stating "invention", the Applicants do not in any way admit that the present application does not include more than one patentably and non-obviously distinct invention, and maintains that this application may include more than one patentably and non-obviously distinct invention. The Applicants hereby assert that the disclosure of this application may include more than one invention, and, in the event that there is more than one invention, that these inventions may be patentable and non-obvious one with respect to the other.

DESCRIPTION OF THE PREFERRED EMBODIMENT

A brief overview of the operation of a clutch plate will first be presented, after which will follow a more detailed description of the present invention.

Figure 1:
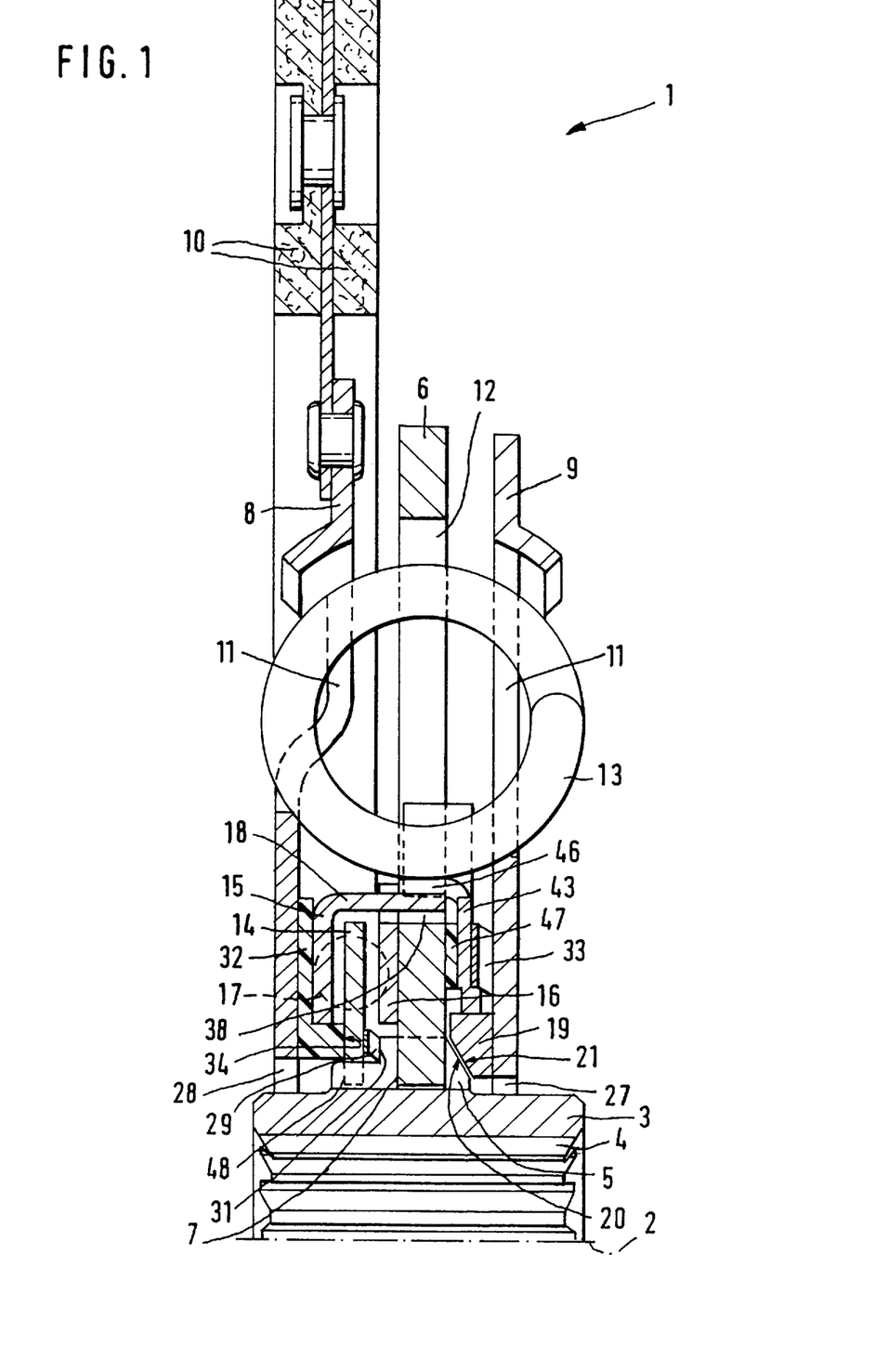
FIG. 1 1 is a longitudinal cross-sectional view of the upper half of clutch plate embodying the invention.

Referring to FIG. 1, a clutch plate 1 generally includes a hub 3 which is connected to a transmission shaft (not shown) for rotation therewith along a rotational axis 2 by external gearing 5 provided on the hub 3. The hub 3 is rotationally driven by a hub plate 6 which, to this end, is provided with internal gearing 7 which mates with external gearing 5 provided on the hub 3. The internal gearing 7 of the hub plate 6 and the external gearing 5 of the hub 3 are not tightly meshed together, however. Instead, the gearings 5 and 7 are configured to provide for some degree of rotational play therebetween, in order to allow for an idle spring feature and an idle friction device (discussed further below) to be employed at relatively low torques.

Two cover plates 8 and 9 are positioned on axially opposite sides of the hub plate 6. The cover plates 8 and 9 are not directly connected to the hub 3, but are instead connected to the hub 3 through the hub plate 6 and through the action of a preferably plurality of load torque springs 13 positioned circumferentially about the clutch plate 1. The load torque springs 13 (preferably coil springs) are positioned within windows 11 (i.e., cutout portions) provided in each of the cover plates 8 and 9, and in windows 12 provided in the hub plate 6.

One of the cover plates (e.g., cover plate 8) has friction linings 10 attached thereto which extend radially outward therefrom. The friction linings 10 are rotationally driven, normally in a conventional manner by being clamped, for example, between a flywheel and a clutch plate of a motor vehicle. The rotational torque imparted to the friction linings 10 is transferred to the hub plate 6 through the action of the windows 11 in the cover plates 8 and 9 driving the load torque springs 13, which in turn contact the windows 12 provided in the hub plate 6 and thereby transfer the rotational driving torque thereto. Once the degree of rotational torque provided in the gearings 5 and 7 is exceeded, the hub 3 is then rotationally driven by the hub plate 6.

The load torque springs 13 provide for a degree of elastic rotational suspension between the driven cover plates 8 and 9 and the driven hub plate 6, whereby sudden torque pulses are not directly transmitted to the hub plate 6, but are taken up by deformation (i.e., compression) of the load torque springs 13. The torque pulses which are accommodated by the load torque springs 13 are generally in a design torque range of the clutch plate 1. Torque pulses of a lesser magnitude are accommodated by the idle spring feature.

The idle spring feature generally includes an additional hub plate 14 which is also mated to the external gearing 5 of the hub plate 6 by internal gearing 48 provided on the additional hub plate 14. Generally, the internal gearing 48 of the additional hub plate 14 is designed so that there is no rotational play (or slack) and the additional hub plate 14 is closely meshed with the hub 3. The idle spring feature additionally generally includes an additional cover plate 15 and an idle torque spring 17 (preferably also a coil spring). Both of the additional hub plate 14 and the additional cover plate 15 are also provided with additional windows (similar to the windows 11 and 12 discussed above with respect to cover plates 8 and 9 and hub plate 6) and the idle torque springs 17 are positioned within these additional windows. Accordingly, torque is elastically transmitted from the additional cover plate 15 to the additional hub plate 14 through elastic deformation of the idle torque springs 17.

When rotational torque pulses of a relatively low magnitude are imparted to the cover plates 8 and 9 by the friction linings 10, that is, torques which are in the designed idle range of the clutch plate 1, the load torque springs 13 are relatively uncompressed, and the hub plate 6 moves essentially as though it were rigidly connected with the cover plates 8 and 9. The additional cover plate 15 is generally connected to the cover plate 6 for rotation therewith. In the embodiment of FIG. 1, the additional cover plate 15 is provided with axially extending portions 18 which extend into and engage with openings (or apertures) 38 provided in the hub plate 6. Thus, the low torque pulses are directly transmitted to the additional cover plate 15, and the idle torque spring 17 positioned between the additional cover plate 15 and the hub plate 14 compresses to absorb at least some of these low torque pulses.

The clutch plate 1 additionally preferably includes an idle friction device which, in FIG. 1, is generally embodied in an idle friction element 32 which is positioned between the cover plate 8 and the additional cover plate 15. The friction element has a bearing surface 34 which bears against the additional cover plate 15. Relative rotational movement between the friction element 32 and the additional cover plate 15 which acts to compress the idle torque spring 17 additionally causes friction between the bearing surface 34 of the friction element 32 and the additional cover plate 15. The created friction provides a damping function to damp out excessive idle torque pulses.

When the provided rotational play between the gearings 5 and 7 is exceeded, the idle spring function is bypassed and the rotational connection between the cover plates 8 and 9, the hub plate 6 and the hub 3 becomes effective. At this point, relatively large torque pulses result in some compression of the load torque springs 13 and a corresponding relative rotational movement between the cover plates 8 and 9 and the hub plate 6. Additionally, at this point, a load friction device with which the clutch plate 1 is preferably provided becomes active. The load friction device generally includes a load friction plate (47 in FIG. 1) and a load friction spring (33 in FIG. 1). The embodiment of FIG. 1 is additionally shown as including a control plate 43, with the load friction plate 47 being disposed between the control plate 43 and the hub plate 6. The control plate 43 has axially inward extending portions 46 which extend into the windows 12 provided in the hub plate 6 and contact (i.e., lie flat against) the substantially planar end faces of the load torque springs 13. Thus, the control plate 43 effectively moves with the end faces of the coil springs 13 with which it is in contact. Once the idle spring function has been bypassed by torque pulses of relatively high magnitude, the end faces of the coil springs 13 can move relative to the hub plate 6, thereby additionally causing rotation of the control plate 43 relative to the hub plate 6. The load friction plate 47 which is positioned between the control plate 43 and the hub plate 6 generates frictional forces which act to damp or dissipate energy upon activation of the load torque springs 13.

In one possible embodiment, the control plate 43 functions as follows. The windows 12 in the hub plate 6 are of greater circumferential extent (i.e., they have a greater arc) than the windows 11 provided in the cover plates 8 and 9. Thus, the load torque springs 13 are free to move (for example, in both rotational directions) in unison with the cover plates 8 and 9 for a limited time within the windows 12 in the hub plate 6 before the end faces of the load torque springs 13 contact the closed ends of the windows 12 provided in the hub plate 6. During this initial period of time, before the load torque springs 13 contact the ends of the windows 12 provided in the hub plate 6, the load torque springs 13 are moving relative to the hub plate 6, and since the inward extending portions 46 of the control plate 43 are in contact with the end faces of the load torque springs 13, the control plate 43 is likewise rotating relative to the hub plate 6. The relative rotation between the control plate 43 and the hub plate 6 brings the load friction plate 47 into play, and it generates frictional forces between the control plate 43 and the hub plate 6 which act to damp or dissipate energy during the relative rotation between the control plate 43 and the hub plate 6.

Once the cover plates 8 and 9 have rotated relative to the hub plate 6 to a sufficient extent that the load torque springs 13 have reached the ends of the windows 12, further relative rotation between the cover plates 8 and 9 acts to compress the load torque springs 13. However, at this point, the control plate 43 moves in unison with the hub plate 6, since the inward extending portions 46 of the control plate 43 have also moved into contact with the ends of the windows 12 of the hub plate 6. Therefore, there is no further relative rotation between the control plate 43 and the hub plate 6, and the load friction plate 47 does not generate any further frictional forces. At this point, however, the control plate 43 and the hub plate 6 are moving together in relative rotation with respect to the cover plates 8 and 9, since the load torque springs 13 are being compressed. Consequently, a different set of frictional damping forces can be generated, for example, by the frictional forces created by the load friction spring 33 which is positioned between the control plate 43 and the cover plate, which are in relative rotation with respect to one another.

The inventive clutch plate will now be described with more particularity and by way of a number of preferred embodiments. In the following discussion, the term "idle spring feature" is frequently followed by the term "[disengagement]", and the term "load spring feature" is frequently followed by the term "[engagement]". This is to be understood as indicative of the fact that the idle spring feature is generally active during periods when the clutch of the associated motor vehicle is disengaged, and that the load spring feature is generally active during periods of engagement of the clutch of the associated motor vehicle.

Figure 3:
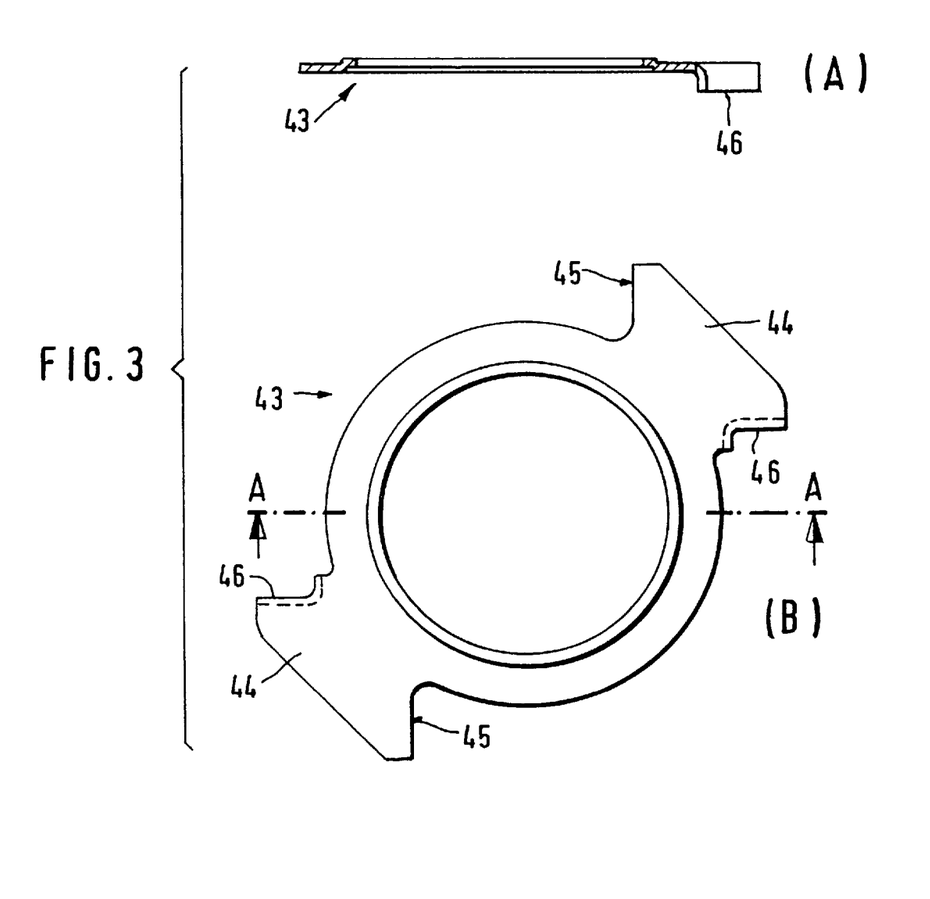
FIG. 3 is an elevational view and a cross-sectional view of a control plate.

FIG. 1 is a cross-sectional view through the upper half of a clutch plate 1. The clutch plate 1 includes a generally centrally located hub plate 6 that is nonrotationally engaged with play (i.e., rotational play about a central axis 2) with a hub 3 and cover plates 8 and 9. The cover plates 8 and 9 are positioned on opposite sides of the hub plate 6, and the cover plates 8 and 9 are nonrotationally connected to each other and are positioned separate from one another by a certain distance. One of the cover plates 8 and 9 has friction linings 10 attached thereto and extending radially outward therefrom. The hub 3 is provided with an internal gearing 4, by which it can be nonrotationally mated to a transmission shaft, which is not specifically shown. The clutch plate 1 and the transmission shaft thereby define a common rotating axis (or shaft) 2. Coiled springs 13 are positioned in windows 11 of the cover plates 8 and 9, as well as in windows 12 of the hub plate 6. The coiled springs 13 permit an elastic retative rotation during torque transfer between the cover plates B and 9 and the hub plate 6. The hub 3 has an external gearing 5 provided thereon which corresponds to a mating gearing 7 provided on the inner diameter of the hub plate 6 in such a way that play is provided towards the circumference (i.e., some degree of rotational play about the axis 2), which allows the aimed employment of an idle spring feature [disengagement] within the region of play between the hub 3 and the hub plate 6. A hub plate 14 for the idle spring feature [disengagement] which is provided with internal gearing 48 is for this purpose engaged with a region of the external gearing 5 of the hub 3 which is of reduced diameter. No play is provided towards the circumference (i.e., no rotational play) between the hub plate 14 and the hub 3. An additional cover plate 15 is located on the side of the hub plate 14 opposite to the hub plate 6. The cover plate 15, in the radial direction outside of the hub plate 14, is provided with angular projections 18 which extend in the axial direction to nonrotationally engage into openings 38 provided in the hub plate 6. The angular projections 18 are supported at the same time in the axial direction on the hub plate 6 by means of corresponding contours between the angular projections 18 and the hub plate 6. An additional cover plate 16 can be positioned between the hub plate 14 and the hub plate 6, but this is not absolutely necessary. Springs 17 are positioned in windows provided in the hub plate 14 as well as in windows provided in the cover plate 15 (and possibly the cover plate 16). The springs 17 attenuate torsion like vibrations, particularly in the idle range [disengagement] during the idle mode within the range of play provided between gears 5 and 7 directed towards the circumference (i.e., rotational play). Only after a relative rotation which is larger than the play provided between the gears 5 and 7 is the idle spring feature [disengagement] bypassed, and the load spring feature [engagement] which employs springs 13 becomes effective. Since the friction linings 10, on the one hand, rotate together with the crank shaft of the combustion engine in the activated state of the friction clutch, and since, on the other hand, the transmission shaft with its rotating shaft 2 does not necessarily align with the rotating crank shaft, there can occur axle displacements in the radial direction and axle pivoting. In order to not impair the proper operation of the clutch plate in such a case, the hub 3 in the present case is provided with a mating surface 20 disposed on an axial end region of the external gearing 5 of the hub 3. The mating surface 20 in the present case is somewhat ball shaped, but could also be increasingly cone shaped, that is, extending from an outside region of the hub 3 in the axial direction to an inward region of the hub 3 in the axial direction, and increasing in diameter in the radially outward direction. A ring shaped element 19 which is provided with a contour 21 is centered on the mating surface 20. The contour 21 is adapted to the shape of the mating surface 20, and in the present case is preferably conic in shape. The ring shaped element 19 is preferably fashioned from plastic and is centered such that its outside diameter (or outer periphery) is in contact with the inside diameter of a control plate 43. The control plate 43 is preferably fashioned as shown in FIG. 3, which is an elevational and cross-sectional view of the control plate 43. The control plate 43 is preferably provided with two approximately diagonally located centering projections 44, which protrude in the radial direction. The centering projections 44 have controlling edges 45 and 46 which rest on the face ends of the coiled springs 13 of the load spring feature [engagement]. The controlling edges 46 can, for example, also be angled (or folded) in the axial direction (as shown in FIG. 3), to enlarge their surface area and to engage with the windows 12 of the hub plate 6 for control, relative to the edges of the windows 12. We do not need to explore the primary function of control plate 43 as a friction producing element, since this follows for example from the German patent 24 18 062 or from the German patent application 29 16 868, each of these published documents being hereby expressly incorporated by reference herein. The control plate 43, in the present case, is used, centering the ring shaped element 19 in the radial direction, directly on the coiled springs 13 of the load spring feature [engagement]. The control plate 43 is supported in all directions by means of its centering projections 44 contacting the face ends of the coil springs 13, so that the ring shaped element 19 is flexibly centered in the radial direction, relative to the hub plate 6. The hub 3 is now positioned on the contour 21 of the ring shaped element 19 by means of the mating surface 20 provided on the external gearing 5 of the hub 3, specifically by means of a compression force in the axial direction exerted by a spring unit 29. The spring unit 29 is supported, on one hand, by a radial shoulder 31 formed on the external gearing 5 of the hub 3 and, on the other hand, by the hub plate 14 of the idle spring feature [disengagement]. The hub plate 14 of the idle spring feature is supported by a bearing surface 34 of a friction element 32. The friction element 32 is centered on the radially inner diameter of the cover plate 15 and abuts against the inside of the cover plate 8. A load friction spring 33 is provided on the side of the hub plate 6 opposite to the location of the idle spring feature [disengagement]. The load friction spring 33 is supported on the inside wall of the cover plate 9 and maintains the control plate 43 in contact with the hub plate 6 through an intermediately located load friction plate 47. Support in the axial direction is accomplished by means of the projections 18 provided on the cover plate 15, the projections 18 of which rest with their corresponding edges on the outside of the hub plate 6. Both of the cover plates 8 and 9 of the load spring feature [engagement] exhibit a sufficiently large gap 27 and 28 in relation to the hub 3.

In the case of a radial misalignment along the axis between the transmission shaft and the crank shaft, the hub 3 relative to the friction linings 10 is loaded down by force in the radial direction and can travel a radial elastic distance by means of the contour 21 and the mating surface 20, as a result of the ring shaped element 19 experiencing support from the control plate 43 on the face ends of the coil springs 13.

Figure 2:
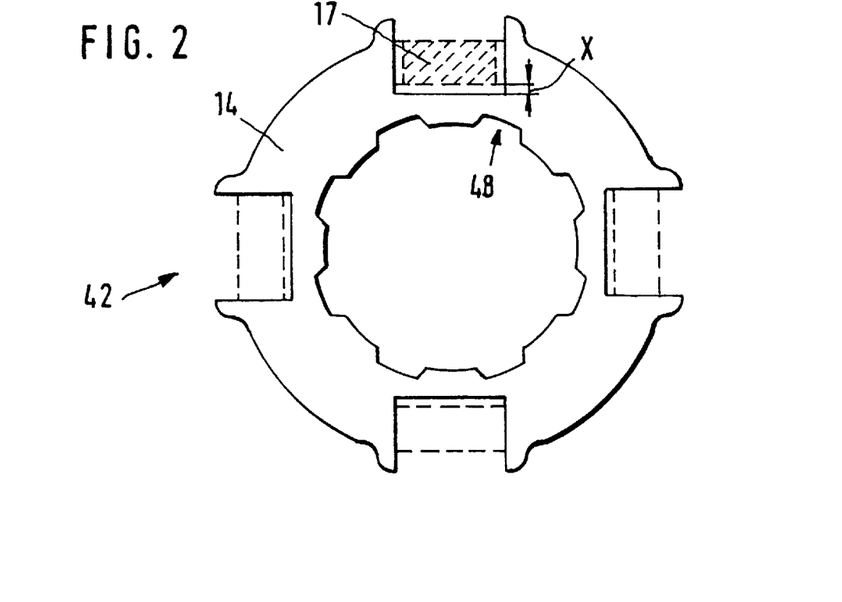
FIG. 2 is an elevational view of a hub plate.

In this way the ring shaped element 19 is indirectly centered on the hub plate 6, since the coil springs 13 are positioned in the windows of the hub plate 6. Even under transient shock loads of the hub 3 is it possible that the hub 3 with its mating surface 20 rises off-center on the contour 21 of the ring shaped element 19, specifically against the force of the spring unit 29, which also provides for recentering. In the case of angular displacement between the transmission shaft and the crank shaft, the hub 3 is pivoted relative to the components 8, 9, 6 of the load spring feature [engagement], whereby a sliding motion occurs between the contour 21 and the mating surface 20 and by unilateral loading of the spring unit 29 and provides for an increase in the centering force. It is accordingly advantageous that glide promoting characteristics be provided between the contour 21 and the mating surface 20 to allow for a pivoting motion which is smooth and free of wear. This smoothness is also aided by the design of the hub plate 14 of the idle spring feature [disengagement]. The hub plate 14 of the idle spring feature, as shown in FIG. 2, is provided with windows 42 for accommodating the springs 17. The windows 42 are preferably of completely open design in the radial direction outward (i.e., the windows 42 are open in the radially outward direction), and which are enlarged in the radial direction inward by a factor of X (shown in FIG. 2). Hub 3 has in this way the capability to make a shift in the case of a pivoting motion, without detrimental effect of the function of springs 17. Hub plate 14 with its internal gearing 48 (shown in FIG. 2) in this way is nonrotationally seated on the reduced diameter portion of the external gearing 5 of the hub 3, but is movable in the axial direction with respect to the hub 3.

Figure 4:
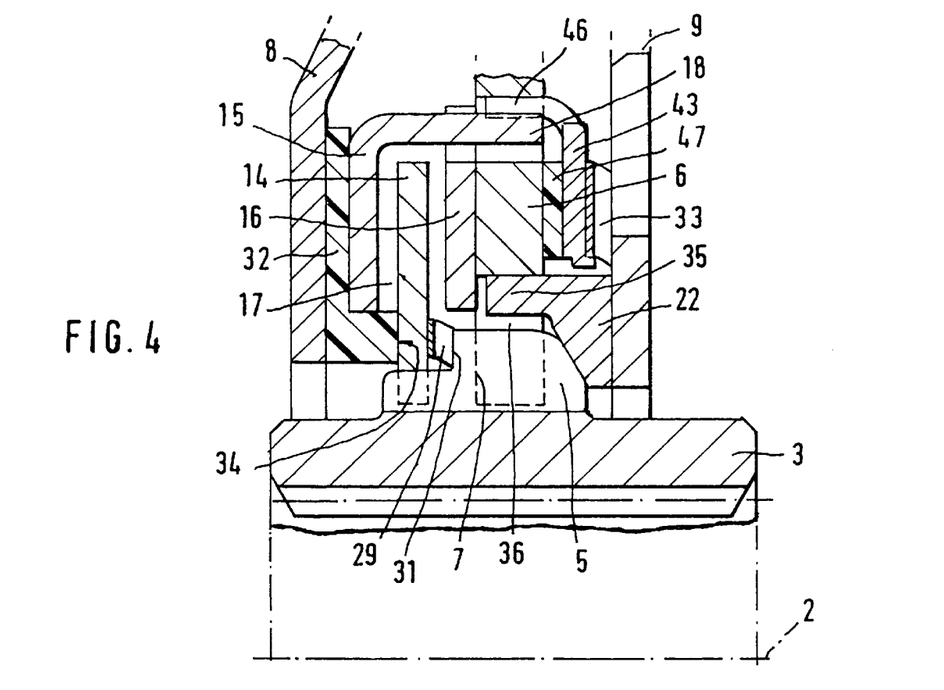
FIG. 4 is a partial cross-sectional view through a variation of FIG. 1.

An alternative embodiment is shown in FIG. 4, wherein only the differences with respect to the embodiment of FIG. 1 will be examined more closely. The customary components are substantially identical both in design and function. The ring shaped element 22 in the embodiment of FIG. 4 is guided directly opposite of the hub plate 6 by projections 35 which extend in the axial direction and engage into corresponding openings 36 provided in the hub plate 6, whereby a mutual centering action is accomplished in spite of the possibility of axial displacement. The radial resilience of the ring shaped element 22, relative to the hub 3, therefore results from the hub plate 6 and the springs 13 of the load spring feature [engagement]. The pivoting capability of hub 3 corresponds exactly to that of FIG. 1.

Figure 5:
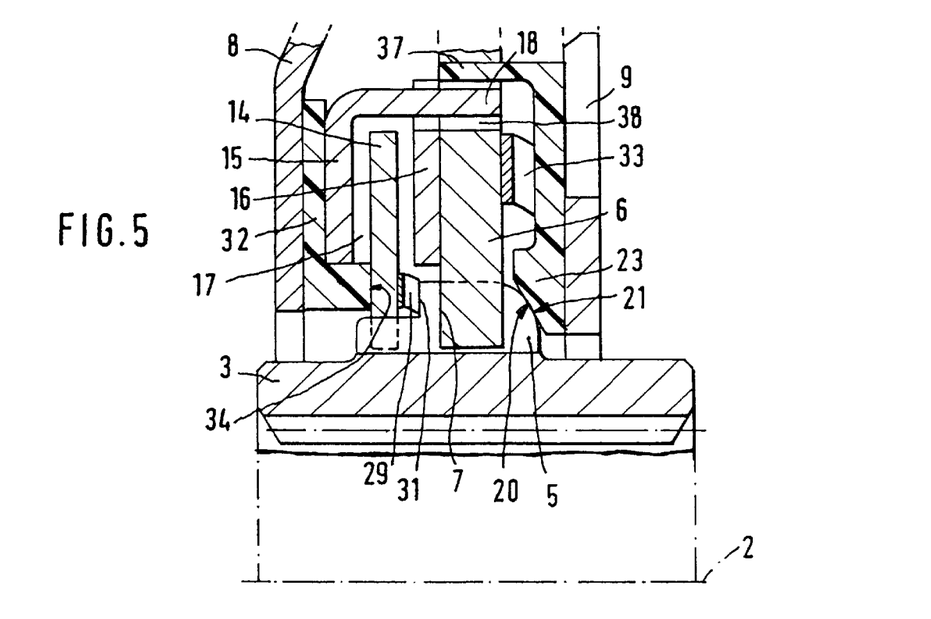
FIG. 5 is a partial cross-sectional view through an additional variation.

In the embodiment shown in FIG. 5, the ring shaped element 23 can, at the same time, be engaged as a load friction element. The construction of the ring shaped element 23 is extended in the radial direction. The ring shaped element 23 mainly abuts the entire surface on the inside of the cover plate 9. The ring shaped element also is provided with tabs 37, which extend therefrom in the axial direction, in the region of the axially extending projections 18 of the cover plate 15 of the idle spring feature [disengagement], which project into openings 38 provided in the hub plate 6 for nonrotational engagement and centering, while being movable in an axial direction. A load friction spring 33 is positioned between the ring shaped element 23 and the hub plate 6. The load friction spring 33 is supported from cover plate 8 by means of projections 18 and a friction element 32. This load friction feature, consisting of elements 9, 23, 33, 6, 15, 32 and 8 is being activated when the idle spring feature [disengagement] is bypassed by the contact made between the gear sets 5 and 7 (i.e., when the rotational play provided between the gearings 5 and 7 is exceeded). The ring shaped element 23 at the same time provides radial support of the hub 3, relative to the hub plate 6, whereby the same is in resilient elastic connection in the radial direction with springs 13 of the load spring feature [engagement].

Figure 6:
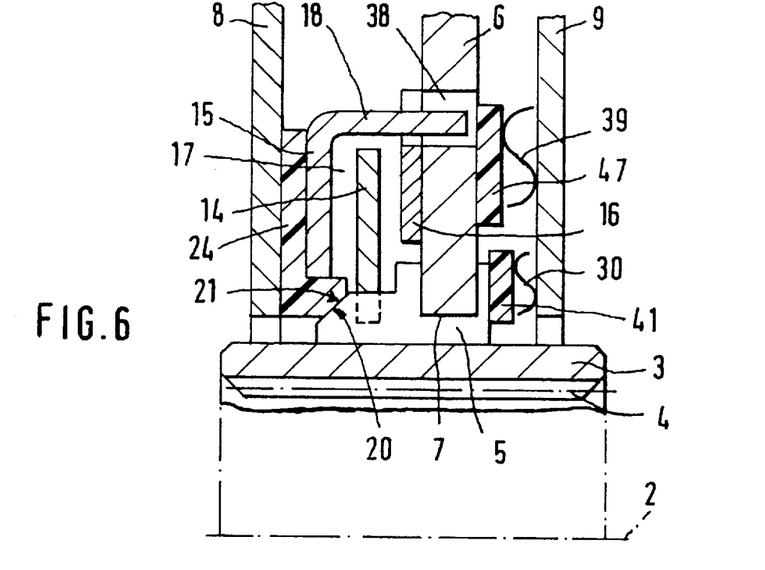
FIGS. 6 to 8 are partial cross-sectional views showing variations wherein the contour and mating surfaces are positioned on the same side of the hub plate as the idle spring feature.
Figure 7:
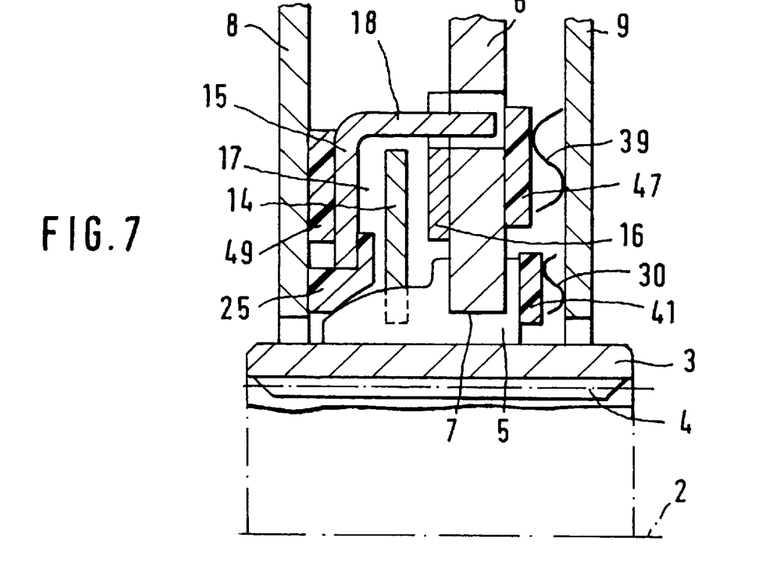
Figure 8:
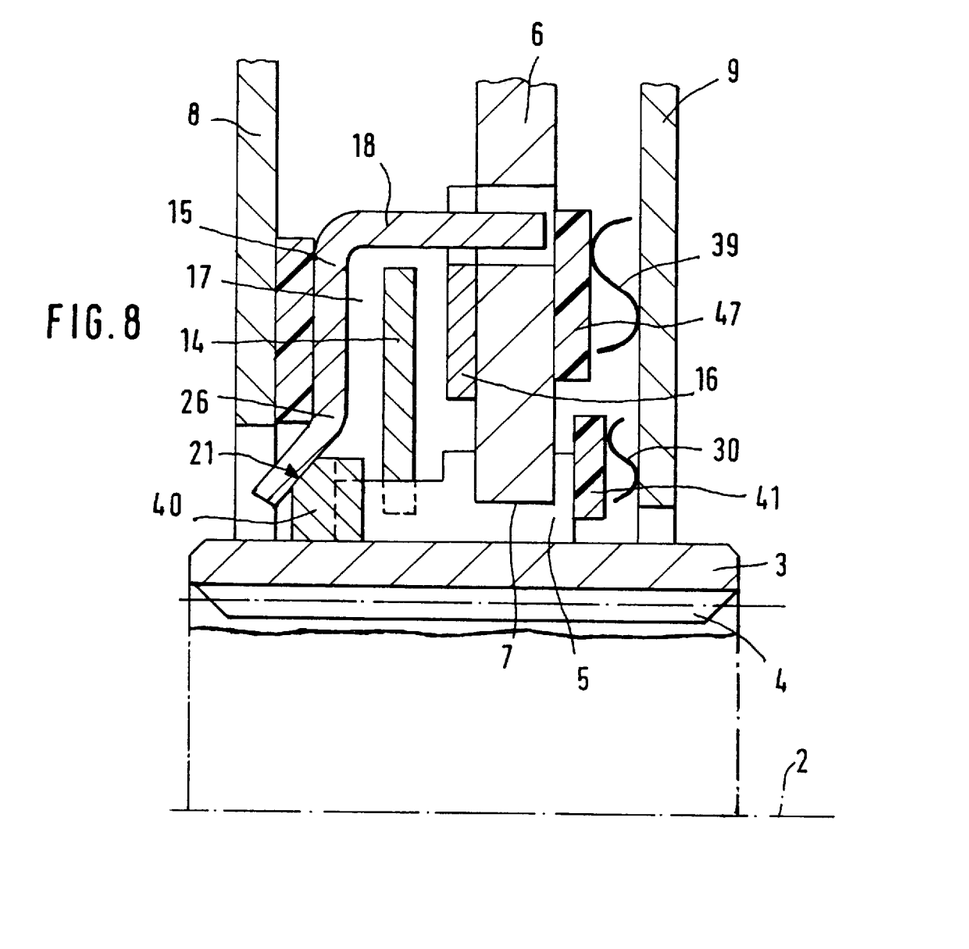

FIGS. 6 to 8 show examples in which the contour surface 21 and the mating surface 20 are positioned on the same side of the hub plate 6 as the idle spring feature [disengagement]. FIG. 6 shows a ring shaped element 24 which is positioned between the cover plate 15 of the idle spring feature [disengagement] and the cover plate 8 of the load spring feature [engagement]. The ring shaped element 24, in this embodiment, functions as a load friction element. The ring shaped element 24 is centered in the radial direction on the cover plate 15 for the idle spring feature and exhibits an inward contour 21 in the radial direction. The mating surface 20 provided on the hub 3 is positioned in the end region of the external gearing 5, immediately adjacent to the region of reduced diameter which engages the hub plate 14 of the idle spring feature [disengagement]. Positioned on the opposite side of the hub plate 6, between the end region of the external gearing 5 and the radially inner region of the cover plate 9, is a spring unit 30 and possibly a friction ring 41. The spring unit 30 provides for centering between the ring shaped element 24 and the mating surface 20 of the hub 3. Since the ring shaped element 24 is centered on the inside diameter of the cover plate 15, and since the cover plate 15 is positioned by means of projections 18 into the openings 38 in the hub plate 6, support of the ring shaped element 24 has been accomplished indirectly to the coiled springs 13 (shown in FIG. 1) of the load spring feature [engagement]. The pivoting capability of the hub 3 relative to the cover plates 8 and 9, as well as the radial displacement against the centering force of the coil springs 13 and against the force of the friction hold is provided, according to the described components for FIGS. 1 to 5, under consideration of the position of a load friction spring 39 positioned between the cover plate 9 and the hub plate 6, possibly by insertion of a load friction plate 47.

FIG. 7 illustrates an embodiment wherein the ring shaped element 25 and the load friction plate 49 are provided as separate components, in contrast to the embodiment of FIG. 6. This causes no change in function. However, in the embodiment shown in FIG. 7, it is possible, to employ different materials for the ring shaped element 25 and for the load friction plate 49, which allows for a better match of the friction forces in the idle range [disengagement] and in the load range.

The ring shaped element 26 in the embodiment shown in FIG. 8 is fashioned directly as a portion of the cover plate for the idle spring feature [disengagement]. The ring shaped element 26, by means of the familiar axially protruding projections 18 which engage with the hub plate 6, is supported in the axial direction and centered in the radial direction. The ring shaped element 26 is preferably constructed from sheet metal stock, and is shown inclined in its radial internal, disk shaped region to be able to show contour 21. The mating surface 20 is preferably formed on a separate plastic ring 40, which is placed on the hub 3, and which is preferably nonrotationally engaged with the hub 3, by engaging the corresponding extensions with the external gearing 5 of the hub 3. In contrast to the design of FIG. 7, no reduction in the number of components has been achieved here, but the friction junction between the contour 21 and the mating surface 20 has, in this case, been improved to provide a surrounding and uninterrupted surface.

As also exemplified in FIGS. 6–8, friction devices can be located on the opposite side of the hub plate 6 from the idle spring feature [disengagement]. For the embodiments shown, these friction devices can include a first friction device operatively disposed between the hub plate 6 and the cover plate 9, including a friction spring 39 and a friction element 47. The friction devices can include a second friction device operatively disposed between the end region of the external gearing 5 and the cover plate 9, including a friction spring 30 and a friction element 41. The friction springs 39 and 30 of the corresponding first and second friction devices can generate a normal force applied to each bearing surface of the corresponding friction element 47 and 41. Therefore these first and second friction devices can be active and an opposing frictional force can be generated in response to relative motion relative to the friction elements 47 and 41. The first friction device can be active during relative motion between the cover plate 9 and the hub disc 6 to act as a load friction device; the second friction device can be active during relative motion between the cover plate 9 and the hub 3, as for example, to act as an idle friction device.

One feature of the invention resides broadly in a clutch plate for a friction clutch, including a hub with internal gear for placement on a transmission shaft, an external gear on the hub to engage with a hub plate with mating gear and with play towards the circumference, cover plates to both sides of the hub plate, which cover plates are non-rotationally engaged amongst each other and held at a distance, and of which cover plates one of them is provided with friction linings, windows in the hub plate and cover plates for the positioning of springs of a load spring feature [engagement] to provide elastic torque transfer, a hub plate as part of an idle spring feature [disengagement] between one of the cover plates and the hub plate, which hub plate is non-rotationally engaged with the external gear of the hub, as well as at least a cover plate between the hub plate of the idle spring feature [disengagement] and the cover plate of the load spring feature [engagement] for the positioning of springs in windows of the cover plate and hub plate for elastic twisting motion in the region of play between the external gear and the mating gear, whereby the cover plate is non-rotationally engaged with the hub plate over angled projections in axial direction and supported by the hub plate in axial direction, and characterized by the fact, that a ring shaped element 19, 22 to 26 is directly or indirectly guided on the hub plate 6 in radial direction, which the hub plate can be centered over a contour 20 rising in axial direction against a mating surface 21 of hub 3 by means of the force of a spring 29, 30 in axial direction.

Another feature of the invention resides broadly in a clutch plate where the mating surface 21 of said clutch plate is formed by the outer surface of external gear 5.

Yet another feature of the invention resides broadly in a clutch plate where the ring shaped element 19, 22, 23 and the mating surface 21 of the external gear 5 of said clutch plate is located on the side of hub plate 6 of the load spring feature [engagement], opposite of hub plate 14 of the idle spring feature [disengagement].

Still another feature of the invention resides broadly in a clutch plate whereby the ring shaped element 24, 25, 26 and the mating surface 21 of external gear 5 of said clutch plate is located on the side of the hub plate 14 of the idle spring feature [disengagement].

A further feature of the invention resides broadly in a clutch plate where the spring 29 of said clutch plate is formed as a crinkle washer or similarly for holding of contour 20 and mating surface 21 in axial direction, this washer, which is placed between the shoulder 31 of external gear 5 and the hub plate 14 of the idle spring arrangement [disengagement], which washer is non-rotationally engaged with the reduced diameter of external gear 5, but which washer is loose in the axial direction, and which washer holds the ring shaped element 19 in contact with cover plate 9.

Another feature of the invention resides broadly in a friction clutch where the crinkle washer 29 of said friction clutch is supported by contour 20 and mating surface 21 and in addition by a friction element 32, which friction element is being held between the cover plate 14 of the idle spring feature [disengagement] and the associated cover plate 8 of the load spring feature [engagement] by means of load friction spring 33, and which friction element provides a bearing surface 34 in its inner diameter region for the hub plate 14 of the idle spring feature [disengagement].

Yet another feature of the invention resides broadly in a friction clutch where the outside diameter of the ring shaped element 19 of said friction clutch is guided by the inside diameter of the control plate 43, which control plate is held by friction between hub plate 6 and cover plate 9, and which control plate is aligned with at least one spring 13 of the load spring.

Still another feature of the invention resides broadly in a clutch plate where the control plate 43 of said clutch plate contains two approximately diagonally positioned centering projections 44, which projections are centered with the two corresponding controlling edges 45, 46 to the face ends of the spring units 13 shaped as coiled springs.

A further feature of the invention resides broadly in a friction clutch where the ring shaped element 22 of said friction clutch is centered on the ring shaped element in radial direction and loosely guided in axial direction by means of axially directed projections 35 into openings in hub plate 6.

Another feature of the invention resides broadly in a clutch plate where the projections 35 of said clutch plate engage immediately outside of the external gear 5 of hub 3 in radial direction into openings 36 in the hub plate 6.

Yet another feature of the invention resides broadly in a clutch plate where at least some of the spaces between the teeth of the mating gear 7 of said clutch plate are enlarged in radial outward direction to form openings 36 for the engagement of the projections 35 of the ring shaped elements 22.

Still another feature of the invention resides broadly in a clutch plate where the radial extension of the ring shaped element 23 of said clutch plate rests on top of cover plate 12, is non-rotationally engaged in radial direction outward (outside of the idle mechanism) with angular shaped tabs 37 in axial directed into openings of the hub plate 6, and which [ring shaped element] is held in contact with cover plate 9 in radial direction within the tabs 37 by a load friction spring 33, which load friction spring rests in addition on the hub plate 6.

A further feature of the invention resides broadly in a clutch plate where preferably the same openings 38 in the hub plate 6 of said clutch plate are intended for non-rotational engagement with the ring shaped element 23 and the cover plate 15 of the idle spring feature [disengagement].

Another feature of the invention resides broadly in a clutch plate where the spring unit 30 of said clutch plate is constructed as crinkle washer or similarly for axial holding of contour 20 and mating surface 21, which crinkle washer is supported between the external gear 5 of hub 3 on the side of the hub plate 6, opposite of the mating surface 21 and the corresponding cover plate 9 of the load spring feature [engagement].

Yet another feature of the invention resides broadly in a clutch plate where the ring shaped element 24, 25 of said clutch plate, is guided in radial direction on the inner edge of the cover plate 15 of the idle spring feature [disengagement].

Still another feature of the invention resides broadly in the clutch plate where the ring shaped element 24 of said clutch plate, is extended in radial direction towards the outside beyond the inside diameter of the cover plate 15 and thus functions as a load friction element between the cover plates 15, 8 for the idle and load spring feature [engagement].

A further feature of the invention resides broadly in a clutch plate where the load friction spring 39 of said clutch plate is positioned between hub plate 6 and the cover plate 9 opposite of the idle spring feature [disengagement].

Another feature of the invention resides broadly in a clutch plate where the ring shaped element 26 of said clutch plate, is combined with the cover plate of the idle spring feature [disengagement] as one component, with a contour 20, constructed in radial direction towards the inside, and the mating surface 21, which mating surface is formed by a plastic ring 40, which plastic ring is placed on the hub 3, and which plastic ring at the end region engages non-rotationally with external gear 5.

Yet another feature of the invention resides broadly in a clutch plate where the windows 42 in the hub plate 14 for the idle spring feature [disengagement] of said clutch plate, have an open design in radial outward direction and an enlarged (X) design in radial inward direction to accept the spring units 17, preferably fashioned in form of coiled springs.

Still another feature of the invention resides broadly in a clutch plate whereby play is provided between the external gear 5 of hub 3 of said clutch plate and the mating gear 7 of hub plate 6 in radial direction.

A further feature of the invention resides broadly in a clutch plate where the ring shaped element 24 and cover plate 15 of said clutch plate, are combined into a single plastic component.

One feature of the invention resides broadly in a clutch plate for a friction clutch, including a hub with internal gear for placement on a transmission shaft, an external gear on the hub to engage with a hub plate with mating gear and with play towards the circumference, cover plates to both sides of the hub plate, which are non-rotationally engaged amongst each other and held at a distance, and of which one of them is provided with friction linings, windows in the hub plate and cover plates for the positioning of springs of a load spring feature to provide elastic torque transfer, a hub plate as part of an idle spring feature between one of the cover plates and the hub plate, which is non-rotationally engaged with the external gear of the hub, as well as at least a cover plate between the hub plate of the idle spring feature and the cover plate of the load spring feature for the positioning of springs in windows of the cover plate and hub plate for elastic twisting motion in the region of play between the external gear and the mating gear, whereby the cover plate is non-rotationally engaged with the hub plate over angled projections in axial direction and supported by it in axial direction, and characterized by the fact, that a ring shaped element 19, 22 to 26 is directly or indirectly guided on the hub plate 6 in radial direction, which can be centered over a contour 20 rising in axial direction against a mating surface 21 of hub 3 by means of the force of a spring 29, 30 in axial direction.

Another feature of the invention resides broadly in a clutch plate where the mating surface 21 of said clutch plate is formed by the outer surface of external gear 5.

Yet another feature of the invention resides broadly in a clutch plate where the ring shaped element 19, 22, 23 and the mating surface 21 of the external gear 5 of said clutch plate is located on the side of hub plate 6 of the load spring feature, opposite of hub plate 14 of the idle spring feature.

Still another feature of the invention resides broadly in a clutch plate whereby the ring shaped element 24, 25, 26 and the mating surface 21 of external gear 5 of said clutch plate is located on the side of the hub plate 14 of the idle spring feature.

A further feature of the invention resides broadly in a clutch plate where the spring 29 of said clutch plate is formed as a crinkle washer or similarly for holding of contour 20 and mating surface 21 in axial direction, this washer, which is placed between the shoulder 31 of external gear 5 and the hub plate 14 of the idle spring arrangement, which is non-rotationally engaged with the reduced diameter of external gear 5, but which is loose in the axial direction, and which holds the ring shaped element 19 in contact with cover plate 9.

Another feature of the invention resides broadly in a friction clutch where the crinkle washer 29 of said friction clutch is supported by contour 20 and mating surface 21 and in addition by a friction element 32, which is being held between the cover plate 14 of the idle spring feature and the associated cover plate 8 of the load spring feature by means of load friction spring 33, and which provides a bearing surface 34 in its inner diameter region for the hub plate 14 of the idle spring feature.

Yet another feature of the invention resides broadly in a friction clutch where the outside diameter of the ring shaped element 19 of said friction clutch is guided by the inside diameter of the control plate 43, which is held by friction between hub plate 6 and cover plate 9, and which is aligned with at least one spring 13 of the load spring.

Still another feature of the invention resides broadly in a clutch plate where the control plate 43 of said clutch plate contains two approximately diagonally positioned centering projections 44, which are centered with the two corresponding controlling edges 45, 46 to the face ends of the spring units 13 shaped as coiled springs.

A further feature of the invention resides broadly in a friction clutch where the ring shaped element 22 of said friction clutch is centered on it in radial direction and loosely guided in axial direction by means of axially directed projections 35 into openings in hub plate 6.

Another feature of the invention resides broadly in a clutch plate where the projections 35 of said clutch plate engage immediately outside of the external gear 5 of hub 3 in radial direction into openings 36 in the hub plate 6.

Yet another feature of the invention resides broadly in a clutch plate where at least some of the spaces between the teeth of the mating gear 7 of said clutch plate are enlarged in radial outward direction to form openings 36 for the engagement of the projections 35 of the ring shaped elements 22.

Still another feature of the invention resides broadly in a clutch plate where the radial extension of the ring shaped element 23 of said clutch plate rests on top of cover plate 12, is non-rotationally engaged in radial direction outward (outside of the idle mechanism) with angular shaped tabs 37 in axial directed into openings of the hub plate 6, and which is held in contact with cover plate 9 in radial direction within the tabs 37 by a load friction spring 33, which rests in addition on the hub plate 6.

A further feature of the invention resides broadly in a clutch plate where preferably the same openings 38 in the hub plate 6 of said clutch plate are intended for non-rotational engagement with the ring shaped element 23 and the cover plate 15 of the idle spring feature.

Another feature of the invention resides broadly in a clutch plate where the spring unit 30 of said clutch plate is constructed as crinkle washer or similarly for axial holding of contour 20 and mating surface 21, which is supported between the external gear 5 of hub 3 on the side of the hub plate 6, opposite of the mating surface 21 and the corresponding cover plate 9 of the load spring feature.

Yet another feature of the invention resides broadly in a clutch plate where the ring shaped element 24, 25 of said clutch plate, is guided in radial direction on the inner edge of the cover plate 15 of the idle spring feature.

Still another feature of the invention resides broadly in the clutch plate where the ring shaped element 24 of said clutch plate, is extended in radial direction towards the outside beyond the inside diameter of the cover plate 15 and thus functions as a load friction element between the cover plates 15, 8 for the idle and load spring feature.

A further feature of the invention resides broadly in a clutch plate where the load friction spring 39 of said clutch plate is positioned between hub plate 6 and the cover plate 9 opposite of the idle spring feature.

Another feature of the invention resides broadly in a clutch plate where the ring shaped element 26 of said clutch plate, is combined with the cover plate of the idle spring feature as one component, with a contour 20, constructed in radial direction towards the inside, and the mating surface 21, which is formed by a plastic ring 40, which is placed on the hub 3, and which at the end region engages non-rotationally with external gear 5.

Yet another feature of the invention resides broadly in a clutch plate where the windows 42 in the hub plate 14 for the idle spring feature of said clutch plate, have an open design in radial outward direction and an enlarged (X) design in radial inward direction to accept the spring units 17, preferably fashioned in form of coiled springs.

Still another feature of the invention resides broadly in a clutch plate whereby play is provided the between the external gear 5 of hub 3 of said clutch plate and the mating gear 7 of hub plate 6 in radial direction.

A further feature of the invention resides broadly in a clutch plate where the ring shaped element 24 and cover plate 15 of said clutch plate, are combined into a single plastic component.

The components disclosed in the various publications, disclosed or incorporated by reference herein, may be used in the embodiments of the present invention, as well as, equivalents thereof.

The appended drawings in their entirety, including all dimensions, proportions and/or shapes in at least one embodiment of the invention, are accurate and to scale and are hereby included by reference into this specification.

All, or substantially all, of the components and methods of the various embodiments may be used with at least one embodiment or all of the embodiments, if more than one embodiment is described herein.

All of the patents, patent applications and publications recited herein are hereby incorporated by reference as if set forth in their entirety herein.

The corresponding foreign patent publication applications, namely, Federal Republic of Germany Patent Application No. 195 45 973.3, filed on Dec. 12, 1995, having inventors Jürgen Kleifges, Harald Jeppe, Jërgen Weth, Reinhard Feldhaus, Norbert Lohaus, Andreas Orlamünder, and Klaus Memmel, and DE-OS 195 45 973.3 and DE-PS 195 45 973.3, are hereby incorporated by reference as if set forth in their entirety herein.

The details in the patents, patent applications and publications may be considered to be incorporable, at applicant's option, into the claims during prosecution as further limitations in the claims to patentably distinguish any amended claims from any applied prior art.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. In the claims, means-plus-function clause are intended to cover the structures described herein as performing the recited function and not only structural equivalents but also equivalent structures.

The invention as described hereinabove in the context of the preferred embodiments is not to be taken as limited to all of the provided details thereof, since modifications and variations thereof may be made without departing from the spirit and scope of the invention.

What is claimed is:

1. A clutch plate for a friction clutch, said clutch plate comprising:

a hub, said hub comprising internal gearing for mating with a transmission shaft and rotating therewith, said hub additionally comprising external gearing;

said hub defining an axial direction parallel to an axis of rotation of said hub and a radial direction extending radially outward from said axial direction;

a hub plate, said hub plate having internal gearing for mating with said external gearing of said hub;

said internal gearing of said hub plate and said external gearing of said hub providing a region of rotational play therebetween;

a first cover plate and a second cover plate, said first and second cover plates being disposed on opposite sides of said hub plate and said first and second cover plates being interconnected;

a friction lining connected to one of said first and second cover plates and extending radially outward therefrom;

at least one hub plate window provided in said hub plate;

at least one cover plate window provided in each of said first and second cover plates;

at least one load torque spring disposed in said at least one hub plate window and in each of said cover plate windows;

said at least one load torque spring comprising means for providing elastic load torque transfer between said first and second cover plates and said hub plate;

an additional hub plate disposed between said first cover plate and said hub plate;

said additional hub plate being substantially nonrotationally mated with said external gearing of said hub;

an additional cover plate disposed between said additional hub plate and said first cover plate;

said additional hub plate and said additional cover plate each being also provided with at least one window;

at least one idle torque spring disposed in said at least one window provided in each of said additional hub plate and said additional cover plate;

said at least one idle torque spring comprising means for providing idle torque transfer between said additional cover plate and said additional hub plate within said region of rotational play between said hub plate and said hub;

said additional cover plate comprising a portion extending in substantially said axial direction and nonrotationally engaging said hub plate and bearing on said hub plate in said axial direction;

a ring shaped member connected to said hub plate, said ring shaped member having a contoured surface which is disposed at an angle with respect to said axial direction;

a corresponding mating surface provided on said hub, said corresponding mating surface additionally being disposed at substantially said angle with respect to said axial direction;

biasing means for exerting a biasing force for urging said contoured surface of said ring shaped member and said corresponding mating surface of said hub into contact with one another to thereby align said hub plate and said hub with respect to one another while allowing said hub plate and said hub to elastically displace with respect to one another against said biasing force;

said corresponding mating surface provided on said hub being disposed on said external gearing of said hub;

said additional hub plate and said additional cover plate being disposed on a first axial side of said hub plate; and said ring shaped element and said corresponding mating surface of said hub being disposed on a second axial side of said hub plate, said second axial side of said hub plate being opposite to said first axial side of said hub plate.

2. A clutch plate according to claim 1:

wherein said clutch plate has a designed idle range and a designed load range;

wherein said clutch plate additionally comprises idle friction means for providing a frictional force for damping torque variations in said designed idle range of said clutch plate;

wherein said idle friction means comprises an idle friction spring, said idle friction spring comprising a crinkle washer spring;

wherein said external gearing of said hub is provided with a portion of reduced diameter to thereby form a radially extending surface;

wherein said crinkle washer spring is disposed between and exerts a separating force on said radially extending surface of said external gearing of said hub and said additional hub plate;

wherein said crinkle washer spring exerts a biasing force urging said contoured surface of said ring shaped member and said corresponding mating surface of said hub towards and into contact with one another;

wherein said crinkle washer spring is in substantially nonrotational engagement with said external gearing of said hub;

wherein said crinkle washer spring can move axially with respect to said external gearing of said hub; and wherein said crinkle washer spring urges said ring shaped element into contact with one of said first and second cover plates.

3. A clutch plate according to claim 2, wherein said clutch plate additionally comprises:

a friction element disposed between said first cover plate and said additional cover plate; and a load friction spring urging said first cover plate, said additional cover plate and said friction element into contact with one another; and wherein said friction element comprises a bearing surface, said bearing surface bearing against said additional hub plate;

said bearing surface being provided on a radially inwardly disposed portion of said friction element.

4. A clutch plate according to claim 3:

wherein said clutch plate additionally comprises a control plate, said control plate being disposed between said hub plate and said first cover plate;

wherein said control plate has at least one portion engaging said at least one load torque spring;

wherein said control plate has a substantially central aperture; and wherein said ring shaped member has a radially outer periphery which is disposed within and radially positioned by said substantially central aperture of said control plate.

5. A clutch plate according to claim 4:

wherein said hub plate comprises at least two of said hub plate windows;

wherein each of said first and second cover plates comprise at least two of said cover plate windows;

wherein said at least one load torque spring comprises at least two load torque springs, one each of said at least two load torque springs being disposed in each of said at least two hub plate windows and said at least two cover plate windows;

wherein said at least one portion of said control plate comprises two radially extending arm portions;

said two radially extending arm portions extending substantially diagonally and radially outward from said control plate;

wherein each of said two radially extending arm portions of said control plate comprises a controlling edge portion;

wherein each of said at least two load torque springs has an end face; and wherein one each of said two controlling edge portions of said control plate contacts one each of said end faces of said load torque springs.

6. A clutch plate according to claim 3:

wherein said ring shaped element comprises axially projecting portions;

wherein said hub plate comprises apertures disposed to receive said axially projecting portions of said ring shaped element; and wherein said axially projecting portions of said ring shaped element slidingly engage said apertures of said hub plate to thereby radially position said ring shaped member with respect to said hub plate and to thereby permit relative axial movement between said ring shaped member and said hub plate.

7. A clutch plate according to claim 6:

wherein said axially projecting portions of said ring shaped member slidingly engage said apertures of said hub plate substantially immediately adjacent to and radially outward of said external gearing of said hub.

8. A clutch plate according to claim 7:

wherein said external gearing of said hub comprises gear teeth extending radially outward;

wherein said internal gearing of said hub plate comprises gear tooth spaces for engaging said gear teeth of said hub; and wherein at least some of said gear tooth spaces of said hub plate are extended in the radially outward direction to form at least some of said apertures of said hub plate which are slidingly engaged by said axially projecting portions of said ring shaped member.

9. A clutch plate according to claim 3:

wherein said ring shaped element comprises a radially extended portion which abuts one of said first and second cover plates;

wherein said hub plate comprises openings;

wherein said ring shaped element comprises tab portions extending substantially axially into said openings of said hub plate to thereby nonrotationally engage said ring shaped element with said hub plate;

wherein said engagement of said tab portions of said ring shaped element with said openings of said hub plate to thereby nonrotationally engage said ring shaped member with said hub plate is disposed radially outward of both of said additional hub plate and said additional cover plate;

wherein said load friction spring is disposed between one of said first and second cover plates and said hub plate; and wherein said load friction spring urges said ring shaped element into contact in said axial direction with said one of said first and second cover plates.

10. A clutch plate according to claim 9:

wherein said portion of said additional cover plate extending in said substantially axial direction and nonrotationally engaging said hub plate comprises additional tab portions provided on said additional cover plate; and wherein both of said tab portions of said ring shaped element and said additional tab portions of said additional cover plate engage said openings of said hub plate to thereby nonrotationally connect said hub plate, said additional cover plate and said ring shaped element.

* * * * *

UNITED STATES PATENT AND TRADEMARK OFFICE
CERTIFICATE OF CORRECTION

PATENT NO. : 5,884,743
DATED : March 23, 1999
INVENTOR(S) : Jürgen KLEIFGES, Harald JEPPE, Jürgen WETH,
Reinhard FELDHAUS, Norbert LOHAUS, Andreas ORLAMÜNDER, and Klaus MEMMEL It is certified that error appears in the above-indentified patent and that said Letters Patent is hereby corrected as shown below:

On the title page, item [30], in the Foreign Application Priority Data section, line 2, delete the following: "Feb. 15, 1996 [JP] 8-001467".

In column 4, line 62, after 'FIG. 1' delete "1".

In column 8, line 2, after 'plates', delete "B" and insert --8--.

In column 16, line 53, after 'Jeppe,', delete "Jürgen" and insert --Jürgen--.

Signed and Sealed this

Seventh Day of December, 1999

Attest:

Q. TODD DICKINSON

*Attesting Officer*    *Acting Commissioner of Patents and Trademarks*